United States Patent [19]
Whitcomb

[11] 3,952,971
[45] Apr. 27, 1976

[54] AIRFOIL SHAPE FOR FLIGHT AT SUBSONIC SPEEDS

[75] Inventor: Richard T. Whitcomb, Hampton, Va.

[73] Assignee: The United States of America as represented by the Administrator of the National Aeronautics and Space Administration, Washington, D.C.

[22] Filed: Nov. 9, 1971

[21] Appl. No.: 197,183

[52] U.S. Cl. .............................. 244/35 R; 244/40 R
[51] Int. Cl.[2] .......................................... B64C 3/10
[58] Field of Search .............. 244/34 R, 35 R, 35 A, 244/40 R, 41, 123, 130

[56] References Cited
UNITED STATES PATENTS

| | | | |
|---|---|---|---|
| 1,889,864 | 12/1932 | Merrill | 244/35 R X |
| 2,833,492 | 5/1958 | Fowler | 244/40 R |

OTHER PUBLICATIONS

"NASA Supercritical Wing", NASA Release No. 69–27, Feb. 7, 1969.
"New Wing Designed for Faster Planes", Richard Witkin, New York Times, pp. 1, 65, Feb. 9, 1969.
"New Design for Transonic Wing to be Tested on Modified F–8", Warren C. Wetmore, Aviation Week and Space Technology, Feb. 17, 1969, pp. 22–23.
"Advanced Airfoils Studied for Transports," David A. Brown, Aviation Week & Space Technology, June 22, 1970, pp. 55–57, 60.
"Ultimate Wing for Subsonic Jets may be Major Breakthrough," Product Engineering, July 6, 1970, pp. 92–93.
Thomas, B. K., Jr., "New Wing Promises Design Breakthrough" Aviation Week & Space Technology, July 24, 1967, pp. 25–26.
"The Upside—Down Wing," Time, Feb. 21, 1969, p. 66.

Primary Examiner—Trygve M. Blix
Assistant Examiner—Barry L. Kelmachter
Attorney, Agent, or Firm—Howard J. Osborn; John R. Manning

[57] ABSTRACT

An airfoil having an upper surface shaped to control flow accelerations and pressure distribution over the upper surface and to prevent separation of the boundary layer due to shock wave formulation at high subsonic speeds well above the critical Mach number. A highly cambered trailing edge section improves overall airfoil lifting efficiency.

20 Claims, 12 Drawing Figures

INVENTOR.
RICHARD T. WHITCOMB

BY *Howard J. Osborn*

ATTORNEY

INVENTOR.
RICHARD T. WHITCOMB

BY

ATTORNEY

AIRFOIL SHAPE FOR FLIGHT AT SUBSONIC SPEEDS

ORIGIN OF THE INVENTION

The invention described herein was made by an employee of the National Aeronautics and Space Administration and may be manufactured and used by or for the Government for governmental purposes without the payment of any royalties thereon or therefor.

BACKGROUND OF THE INVENTION

This invention relates to an airfoil and more particularly to an airfoil with a design Mach number in the range of 0.7 to 1.0 and having an upper surface designed to delay shock wave induced boundary layer separation until high subsonic Mach numbers well above the critical Mach number are reached. Because the wing of an aircraft accelerates airflow over its upper surface to create lift, a local region of supersonic flow will form over the top surface of the wing at a Mach number well below one. The upper surface of a conventional airfoil is usually highly curved near the chordwise location of maximum airfoil thickness. When a conventional airfoil is accelerated, supersonic flow first appears in an area above the upper surface and near the chordwise location of maximum thickness at a Mach number known as the critical Mach number. Just aft of the area of supersonic flow, a shock wave is formed.

Airflow across a shock wave always decreases from supersonic to subsonic velocity. The strength of the shock wave varies with the amount of this deceleration of flow velocity, and a strong shock wave robs the flow of much of its energy. When a conventional airfoil is accelerated past its critical Mach number, the area of supersonic flow above the upper surface grows larger, the velocities of this flow are greater, and the shock wave becomes progressively stronger. The flow can now be called supercritical. As the shock wave grows stronger, the thin sluggish layer of air near the airfoil surface known as the boundary layer is influenced by the shock wave. In fact, the boundary layer attempts to reverse itself aft of the shock and flow upstream toward the shock causing a phenomenon known as shock-induced boundary layer separation.

A separated boundary layer creates a turbulent wake aft of the shock blanketing the rear portion of the airfoil upper surface. Thus the airfoil upper surface aft of the shock creates little lift, while the turbulent wake greatly increases drag. Moreover, the shock wave may not be stationary upon the upper surface of the airfoil but may move forward and aft, especially on a flexible wing. On an aircraft with two wings, the shock systems on both wings do not move forward and aft in synchronous motion. This causes the airplane to wobble or dutch roll as the shock wave motion on each wing randomly affects lift and drag of that wing. Thus, shock-induced separation at high subsonic Mach numbers above the critical Mach number causes lift loss, drag rise and instability.

The conventional approach to solving the problem of shock-induced separation has been to increase the critical Mach number by using a thinner wing section or by using sweepback. However, a thin or swept wing pays a penalty in higher stalling speeds, a smaller maneuvering envelope, and tip stall. The so-called "peaky" airfoil invented by Pearcy of England incorporates a modification near the leading edge to provide a substantial local increase in velocity and the early formation of a shock wave near the leading edge. This delays boundary layer separation, but the low-speed, high-lift characteristics of such airfoils are not desirable.

SUMMARY OF THE INVENTION

The present invention includes an airfoil having a specially shaped upper surface for reducing the strength of the shock wave formed above the upper surface at a subsonic design Mach number well above the critical Mach number and for increasing the energy of the boundary layer aft of the shock. Improved operation at such Mach numbers make this airfoil a true supercritical airfoil. The airfoil leading edge section is shaped to accelerate airflow over the top surface rapidly to a maximum value. The upper surface itself is flattened to maintain this maximum value at an approximately constant velocity. The velocity decrease occurring as the airflow passes through the shock takes place aft of the midchord station of the airfoil. The flow velocity behind the shock is near Mach one and remains approximately constant or increases slightly for some distance rearward before decreasing to a value approximately equal to the free stream velocity at the trailing edge. The supercritical airfoil's lower surface is designed to avoid formation of supersonic flow over the lower surface at or below the design Mach number. A cusped or highly cambered trailing edge section may be added to the basic supercritical airfoil creating an area of high pressure under the aft portion of the airfoil and contributing substantially to the lift produced. Not only does this supercritical airfoil have a design point well in excess of the critical Mach number at which the boundary layer has not separated, but low-speed, high-lift characteristics are good. Additionally, high-lift may be produced at high speeds and, in general, off-design characteristics of this airfoil are quite good.

Accordingly, it is an object of the present invention to provide a supercritical airfoil which does not experience shock wave-induced boundary layer separation until Mach numbers well above the critical Mach number.

Another object of the invention is to provide an airfoil having good high-lift characteristics throughout its desired speed range and particularly at low speeds and at Mach numbers above the critical Mach number.

It is a further object of the present invention to provide an airfoil operating efficiently at Mach numbers well above the critical Mach number in the range 0.7 to 1.0 and having a greater thickness than conventional high-speed airfoils, thus realizing advantages of higher structural strength, ease of manufacture and increased area for fuel storage.

BRIEF DESCRIPTION OF THE DRAWINGS

A more complete appreciation of the invention and many of the attendant advantages thereof will be readily apparent as the same becomes better understood by reference to the following detailed description when considered in connection with accompanying drawings wherein.

DESCRIPTION OF THE PREFERRED EMBODIMENT

Figure 1:
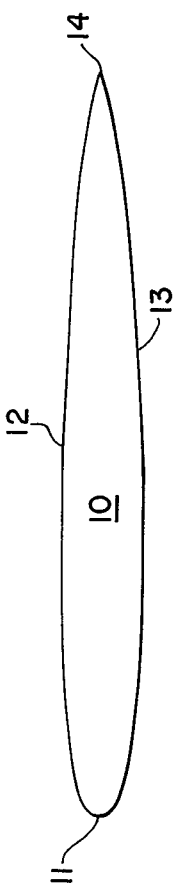
FIG. 1 illustrates the basic shape of the supercrictal airfoil.
Figure 2:
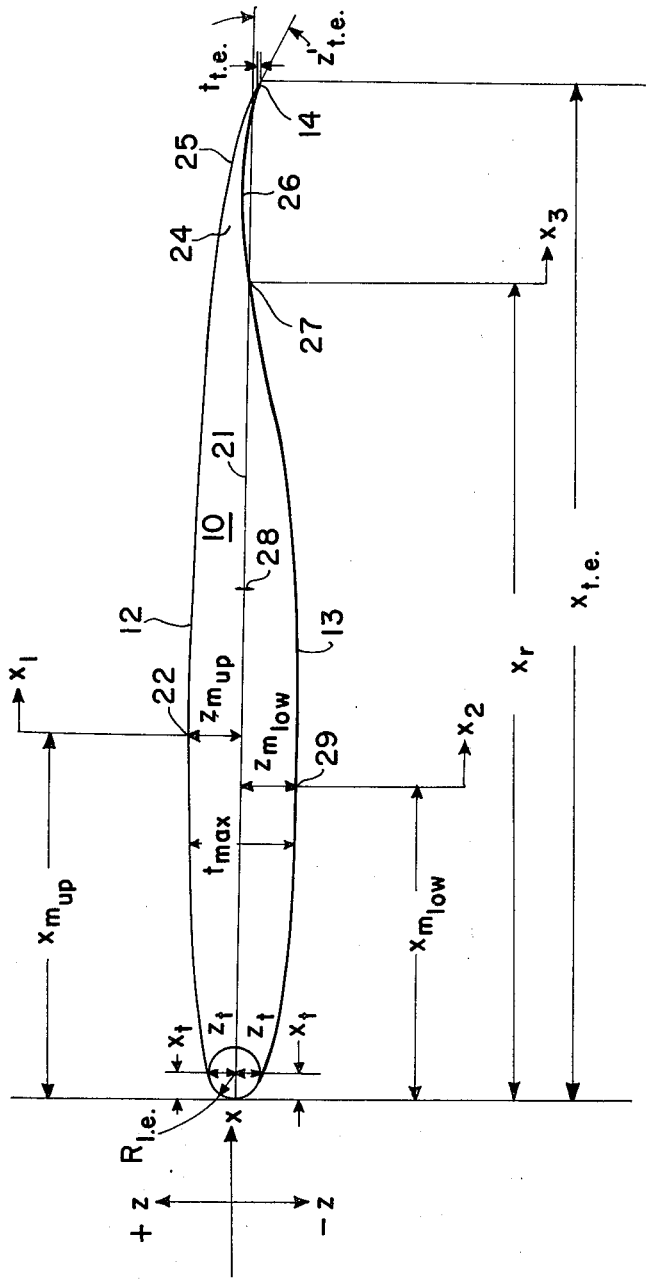
FIG. 2 shows the supercritical airfoil with a highly cambered triling edge section.

Referring now more particularly to the drawings wherein like numerals designate identical parts throughout the several views, and more particularly to FIG. 1, there is shown the basic design of the supercritical airfoil 10 having a leading edge 11, an upper surface 12, a lower surface 13 and a trailing edge 14. In FIG. 2, supercritical airfoil 10 is shown having a cusped or highly cambered trailing edge section 24. Airfoil 10 has a leading edge 11 and a leading edge radius of curvature $R_{1.e.}$. This leading edge radius is faired into the upper surface 12 at a distance $x_t$ from the leading edge and a distance $z_t$ from the chord line 21. Upper surface 12 has an upper point of minimum curvature 22 at a distance $x_{m_{up}}$ from the leading edge and at a distance $z_{m_{up}}$ above the chord line 21. The trailing edge section 24 has an upper surface 25 and a lower surfae 26. Trailing edge 14 has a thickness $t_{t.e.}$ at a distance $x_{t.e.}$ from the leading edge. The leading edge radius is also faired into the lower surface 13 at a distance $x_t$ from the leading edge, this point being a distance $z_t$ below the chord. A lower point of minimum curvature 29 is located on the lower surface 13 at a distance $x_{m_{low}}$ from the leading edge and at a distance $z_{m_{low}}$ below the chord 21. Lower surface 13 has a junction 27 at a distance $x_r$ from the leading edge where the convexity of lower surface 13 fairs into the concavity of the lower surface 26 of trailing edge section 24. It should be noted that the upper point of minimum curvature 22 is aft of the chordwise location of maximum airfoil thickness, $t_{max}$ and forward of the midchord station 28.

Figure 3A:
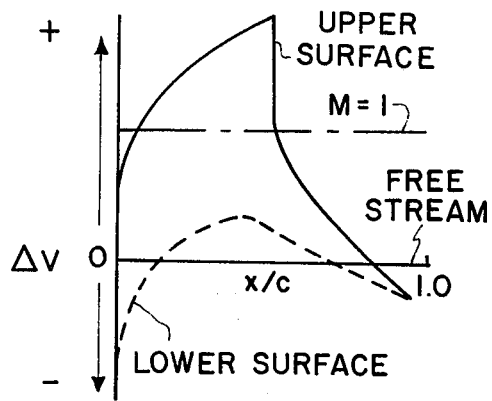
FIG. 3a is a graph of the variation in local velocity from free stream velocity over the upper surface and under the lower surface of a conventional airfoil at a free stream Mach number of approximately 0.7.

Referring now to FIG. 3a, there is shown a graph of the variation in local velocity from the free stream velocity over the upper surface and under the lower surface of a conventional airfoil 30 subjected to airflow having a free stream velocity greater than the critical Mach number of airfoil 30. As free stream velocity reaches the critical Mach number and airflow over the upper surface is accelerated to supersonic velocity, there is a steady increase in local velocities rearward over the upper surface to a point marking the end of the region of supersonic flow above the upper surface. At this point, local velocity drops sharply to just below Mach one and then gradually to a value less than free stream velocity at a trailing edge. Lower surface local velocities follow a similar pattern except that velocities across the lower surface are not yet supersonic.

Figure 3B:
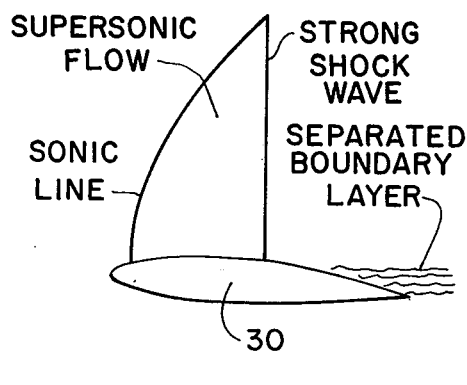
FIG. 3b illustrates the fluid flow about a convention airfoil at a Mach number of approximately 0.7.

FIG. 3b shows the area of supersonic flow bounded by a sonic line above the upper surface of the conventional airfoil. The strong shock wave represents a discontinuity in the flow where supersonic flow is abruptly decelerated to subsonic flow. Aft of this strong shock wave on the upper surface, the boundary layer has separated. The area blanketed by the separated boundary layer produces little lift and the turbulent wake causes a very high increase in drag with increasing airspeed which is known as the drag rise.

Figure 4A:
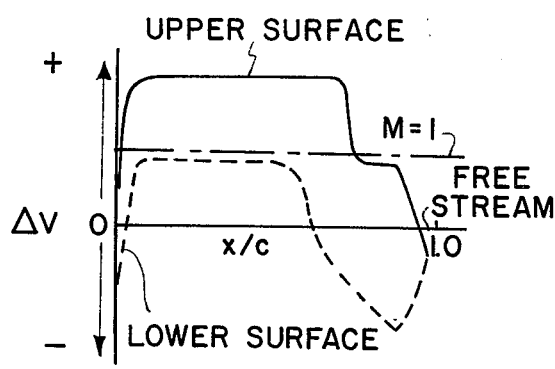
FIG. 4a is a graph of the variation in local velocity from free stream velocity above the upper surface and below the lower surface of a supercritical airfoil at a free stream Mach number of approximately 0.8.
Figure 4B:
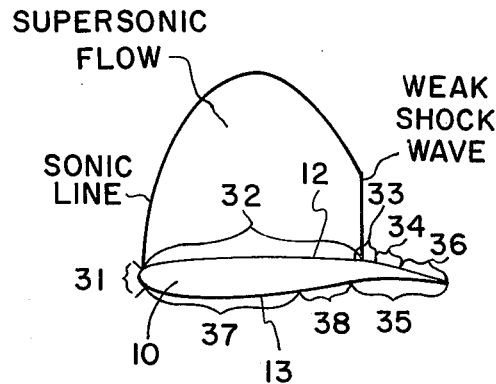
FIG. 4b illustrates the fluid flow above a supercritical airfoil at a Mach number of approximately 0.8.

Referring now to FIGS. 4a and 4b, there is shown a supercritical airfoil 10 operating at a Mach number of approximately 0.8, well above the critical Mach number. Flow over the leading edge section 31 of airfoil 10 is rapidly accelerated over the upper surface to a supersonic local velocity. Controlled supersonic flow, bounded by a sonic line, over a first region 32 of airfoil 10 produces the flat area of approximately constant local velocities shown in FIG. 4a. There is an abrupt drop in velocity thereafter over a second region 33 due to the weak shock wave formed over the second region 33 of airfoil 10. Just aft of the shock wave, there is an area of approximately constant near-sonic local velocity extending over a third region 34 of airfoil 10. Local velocities then drop smoothly over a fifth region 36 to a value at the trailing edge which is near the free stream. Airflow passing under airfoil 10 is also accelerated by the leading edge section 31 to a high subsonic local velocity. This velocity is maintained at an approximately constant value over a sixth region 37 of airfoil 10, thereafter decreasing to the free stream value over a seventh region 38 of airfoil 10 and further decreasing to values well below free stream velocity in a fourth region 35.

Figure 5A:
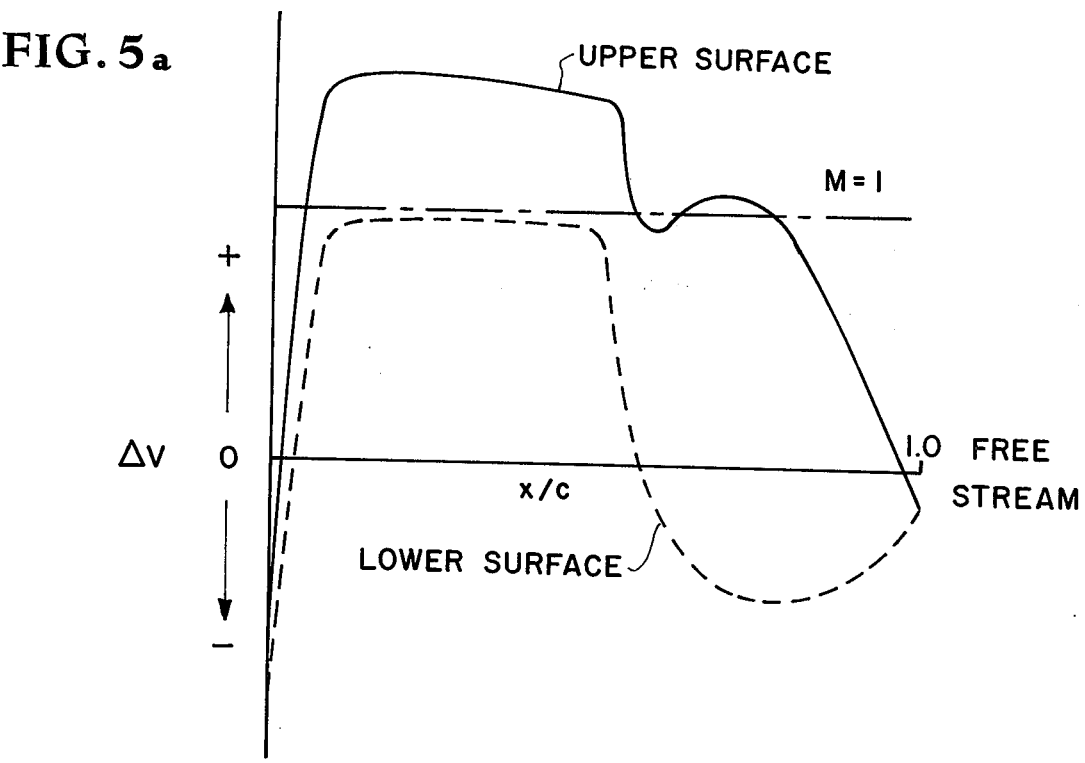
FIG. 5a is a graph of the variation in local velocity from the free stream velocity above the upper surface and below the lower surface of the supercritical airfoil at a free stream Mach number slightly below 0.8.
Figure 5B:
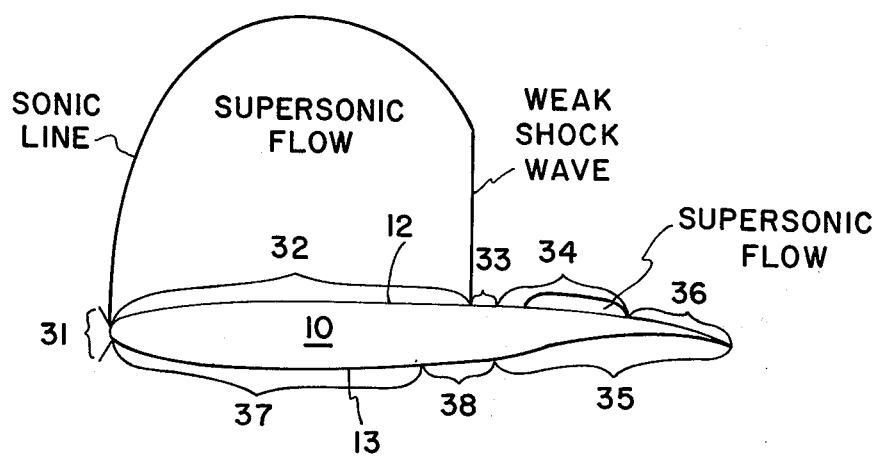
FIG. 5b illustrates the fluid flow above the supercritical airfoil at a Mach number slightly below 0.8.

FIGS. 5a and 5b show another embodiment of the supercritical airfoil operating at a Mach number slightly below 0.8. Flow over the leading edge section 31 is rapidly accelerated over the upper surface 12 to a supersonic local velocity, the local flow velocity is approximately constant thereafter over first region 32, and the velocity drops sharply to a high subsonic value over second region 33. For this embodiment, however, there is a positive velocity gradient over the third region 34 as contrasted with the velocity plateau above the third region 34 shown in FIG. 4a. A second region of supersonic flow is created, as shown in FIG. 5b, over third region 34, but local flow velocities are near sonic and no second shock wave is formed thereafter. The rest of the velocity variation and flow for the alternate embodiment in FIGS. 5a and 5b is practically identical to that shown in FIGS. 4a and 4b. The first through the seventh regions (32–38 in FIGS. 4b and 5b) correspond to the velocities produced as shown in FIGS. 4a and 5a and not necessarily to the points of airfoil geometry noted and labeled in FIG. 2.

Figure 6:
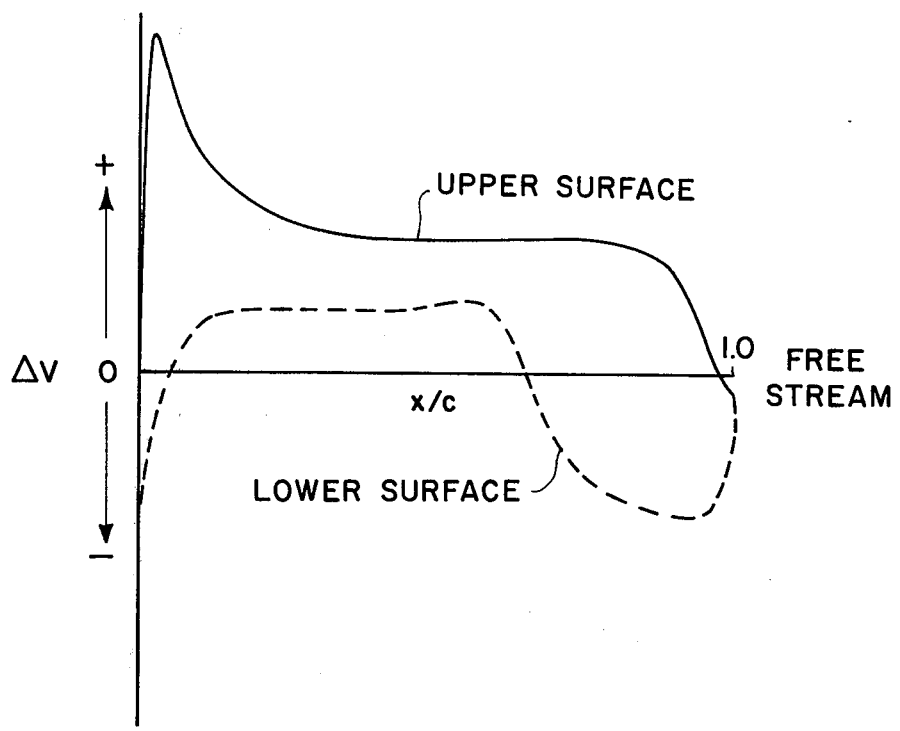
FIG. 6 is a graph of the variation in local velocity from free stream velocity above the upper surface and below the lower surface of the supercritical airfoil at a section normal coefficient of approximately 0.5 and at a (subcritical) Mach number of approximately 0.6.

Referring now to FIG. 6, there is shown a graph of the variation in local velocity from the free stream velocity over the upper and lower surfaces of the supercritical airfoil which demonstrates that the subcritical off-design characteristics of the supercritical airfoil are quite good. In the mid-lift range and at a Mach number of 0.6 (design Mach number of approximately 0.8), the supercritical airfoil has high peak upper surface local velocities near the leading edge, a plateau of constant local velocities thereafter, and a steady drop in velocity to the trailing edge. Lower surface local velocities are similar to those of the lower surface at the design Mach number with an area of velocities which are much lower than free stream below and near the trailing edge. This particular Mach number and lift point particularly illustrate the fact that the supercritical airfoil is aft-loaded.

Figure 7:
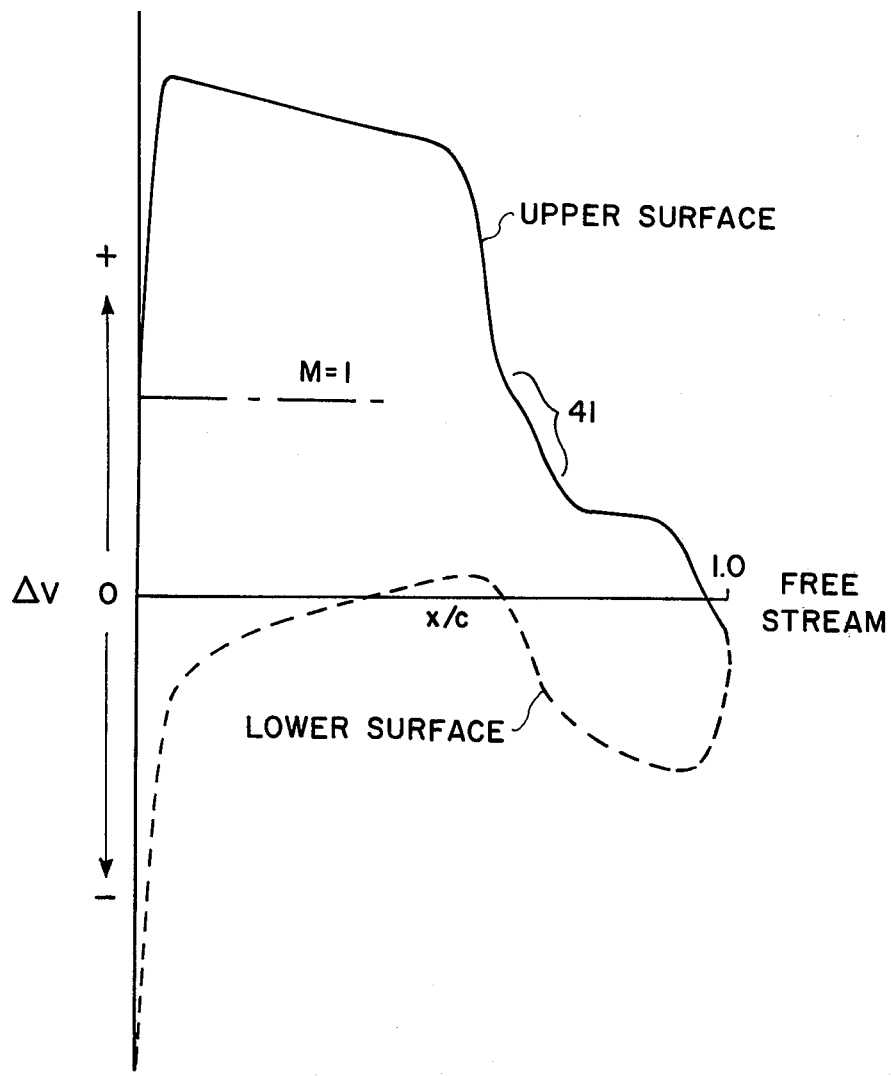
FIG. 7 is a graph of the variation in local velocity from free stream velocity above the upper surface and below the lower surface of a supercritical airfoil producing high lift at a Mach number of 0.73.

Referring now to FIG. 7, there is shown a graph of the variation in local velocity from the free stream velocity over the upper and lower surfaces of a supercritical airfoil performing at high lift and below, but near, the design Mach number. Even for this very high speed, high lift case with a large area of supersonic flow over the upper surface, the boundary layer does not separate. A wiggle in the velocity variation curve 41 is caused by a boundary layer bubble phenomenon. This bubble marks a local boundary layer separation followed by a re-attachment to the surface. As in the design Mach number, low-lift case, a weak shock wave is formed on the upper surface and there is an area of approximately constant local velocity aft of the shock. This velocity plateau aft of the shock is important since a velocity drop aft of the shock would tend to separate the boundary layer bubble. At the high angles of attack required to produce high lift, the forward portion of the velocity variation diagram for the lower surface is altered somewhat from that in FIG. 6 and the forward portion of the upper surface velocity curve is more sloping.

Figure 9:
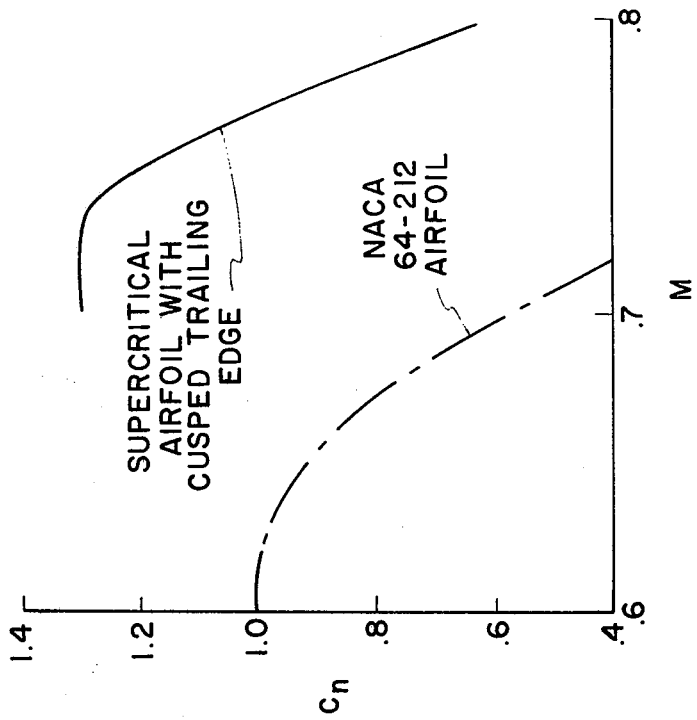
FIG. 9 is a graph of the section normal coefficient as it varies with Mach number for both a conventional airfoil and the supercritical airfoil.
Figure 8:
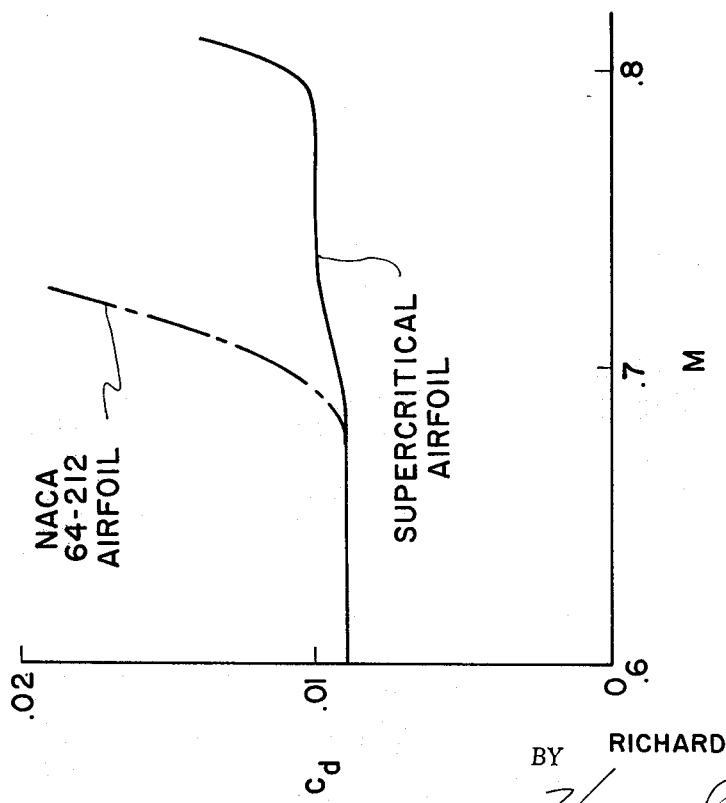
FIG. 8 is a graph of the variation in section drag coefficient with Mach number for both a conventional airfoil and the supercritical airfoil.

FIG. 8 contrasts the drag rise Mach numbers of a conventional NACA $64_1$-212 airfoil with the supercritical airfoil. The drag rise Mach number for the conventional airfoil is near 0.7 Mach number while for the supercritical airfoil, it is near a Mach number of 0.8. FIG. 9 contrasts the drop in section normal force coefficient of a conventional NACA $64_1$-212 airfoil with that of the supercritical airfoil. Normal force here can be thought of as lift for purposes of contrasting buffet (or normal force) boundaries. The normal force boundary for the conventional airfoil occurs at a Mach number slightly higher than 0.6 but is delayed for the supercritical airfoil, even at a high-lift condition (lift coefficients of approximately 1.3 at a Mach number 0.73), to a Mach number above 0.7. The basic supercritical shape without a cambered trailing edge would produce less normal force (lift) than that shown by FIG. 9, but the force (buffet) boundary Mach number would be approximately the same.

OPERATION

The operation of the present invention is now believed apparent. To achieve the desired results as shown in FIGS. 8 and 9 for the supercritical airfoil, the acceleration of flow over the airfoil upper surface 12 must be controlled. The area of supersonic flow above the first region 32 of airfoil 10 in FIG. 4b represents an area of interacting expansion and compression waves. Expansion waves generated at the leading edge and directed rearward and upward are reflected at the sonic line as compression waves. These compression waves are in turn reflected at the first region 32 back to the sonic line where they are again reflected as expansion waves. Part of the invention lies in the design of the upper surface 12 of airfoil 10 so that the compression waves which decelerate the flow are balanced by the expansion waves which accelerate the flow. This gives the flat-topped velocity curve existing over the first region 32 as shown in FIG. 4a.

With the airfoil moving at subsonic speeds, supersonic flow above the first region 32 must eventually decelerate through a shock wave to subsonic velocity. Another feature of the invention is the design of the upper surface 12 of the supercritical airfoil 10 so that the flow immediately aft of the shock wave remains at an approximately constant, near-sonic velocity for some distance rearward. The upper point of minimum curvature 22 on the upper surface 12 shown in FIG. 4a is located ahead of the shock wave, and the curvature of the upper surface 12 increases continuously both forward and rearward from the upper point of minimum curvature 22. It is the higher curvature aft of the shock wave which results in the region of constant flow velocity above the surface and aft of the shock wave which is near Mach one. Flow velocities above this region of constant, near-sonic velocities are significantly below Mach one. Therefore, decelerating disturbances generated at the trailing edge can move forward over the top of the high velocity region and over the shock wave to reduce velocities above and forward of the shock wave. However, the high velocity flow behind the shock wave and near the upper surface 12 limits the effect of trailing edge disturbances aft of the shock and near the surface.

The region of approximately constant, near-sonic velocities above the third region 34 on the upper surface 12 is also required to stabilize the boundary layer. Because of the low energy of the boundary layer, it decelerates more than stream flow as it passes through the shock wave. Thus, if the pressure gradient across the shock wave is too great, the boundary layer flow will reverse, causing boundary layer separation. The region of approximately constant, near-sonic velocities, aft of the shock provides an energy mixing region wherein the boundary layer gains energy through mixing with the free stream, thus reducing the tendency of the boundary layer to separate. This feature of the invention involves strengthening the boundary layer as opposed to weakening the shock wave. From near-sonic velocities just aft of the shock, velocity over the fifth region 36 decreases gradually to a value at the trailing edge which is near the free stream. Design of the trailing edge section 24 (discussed later) must insure that the velocity at the trailing edge will be near free stream velocity to prevent boundary layer separation aft of the near-sonic velocity plateau.

At Mach numbers slightly below the design Mach number, performance of the supercritical airfoil as shown in FIGS. 5a and 5b, differs from the design Mach number only slightly. This difference lies in the production of local velocities over the third region 34. For these Mach numbers, there is a slight rise in local velocity over the third region 34. Although local velocity increases from a high subsonic value to a low supersonice value over the third region 34, no shock wave is formed aft of this second region of supersonic flow.

Velocities over this third region 34 are near-sonic and the small area of supersonic flow is shockless for free stream Mach numbers below and near the design Mach number. This favorable velocity gradient over third region 34 strengthens the boundary layer even more efficiently than at the design Mach number.

Although less critical to the design of the supercritical airfoil, the leading edge 11 of the supercritical airfoil 10 is also an important feature of the invention. The leading edge should be blunt in order to accelerate the flow rapidly to supersonic speed and generate maximum flow expansion in the area of supersonic flow above the first region 32. However, the leading edge 11 must not generate a flow velocity which cannot be maintained across first region 32. There is a danger that too much bluntness and too much acceleration will cause such a high local Mach number near the leading edge that a strong shock will be formed and boundary layer separation in the vicinity of the leading edge will result. This boundary layer separation near the leading edge is particularly a problem at high angles of attack. The lower surface 13 must be designed to prevent formulation of supersonic flow over the lower surface at Mach numbers below the design Mach number, at least one positive angles of attack.

The concave cusp formed by the lower surface 26 of the trailing edge section 24 shown in FIG. 2 is not particularly essential to the supercritical design. In fact, the basic airfoil in FIG. 1 embodies the principle novelty of the invention. However, the lifting efficiency of the basic design is greatly improved by the addition of the trailing edge cusp. The principal applications of the basic design would include aircraft empennages and outboard sections of helicopters rotor blades while the cusped design in FIG. 2 would be used in aircraft wing applications. The slope of the upper surface 25 and lower surface 26 near the trailing edge 14 should be approximately the same for best results at high lift conditions. The drop in velocity over the fifth region 36 is controlled to give a velocity near the free stream value at the trailing edge 14. As mentioned before, this is important in avoiding boundary layer separation over the fifth region 26. However, lower surface design of the trailing edge section 24 is primarily concerned with the production of higher pressures in a fourth region designated by the reference numeral 35 (FIG. 4b shows area) to improve the overall lifting efficiency of the supercritical airfoil. The aft loading of the supercritical airfoil does not adversely affect stability characteristics.

Now describing the designs particulars and examining FIG. 2, an important feature of the design of the supercritical airfoil 10 is the location of the upper point of minimum curvature 22 aft of the chordwise location of maximum airfoil thickness, $t_{max}$, and forward of the midchord 28. The upper point of minimum cuvature 22 is found at about the 0.4 chord station. Airfoil curvature ahead of and behind the points of upper and lower minimum curvature increases continuously. The lower point of minimum curvature 29 on the lower surface 13 of the airfoil 10 is positioned at about the 1/3 chord.

Leading edge radius design is important since the leading edge radius must be such that optimum flow expansion over the upper surface is produced in the supercritical case while the leading edge radius must not induce excessive local increase in velocity at high angles of attack for the lower speeds. For unswept wings, the leading edge radius is faired into the upper surface 12 and lower surface 13 at points on the arc of the leading edge circle approximately 45° away from the leading edge 11 above and below chord line 21 (see FIG. 2). The leading edge radius is sized so that the distance $z_t$ shown in FIG. 2, the slope, and the curvature at $x_t$, $z_t$ for the upper surface 12 and the lower surface 13 equal the values corresponding to the upper and lower 45° points on the leading edge circle of radius $R_{1.e.}$. Mathematical expression for the leading edge is:

$$R_{1.e.} = \sqrt{2}\,(x_m)_{mean} \left(\frac{(z_m)_{mean}}{(x_m)_{mean}}\right)^{1.606} \quad (1)$$

where $$(x_m)_{mean} = \sqrt{(x_{m_{up}})\,(x_{m_{low}})} \quad (2)$$

and $$(z_m)_{mean} = \sqrt{(z_{m_{up}})\,(-z_{m_{low}})} \quad (3)$$

and where
$x_{m_{up}}$ and $x_{m_{low}}$ are the chordwise locations shown in FIG. 2 for the upper point of minimum curvature 22 and lower point of minimum curvature 29 and $z_{m_{up}}$ and $z_{m_{low}}$ are the distances above and below the chord line 21 to the points 22 and 29, respectively. Note that $z_{m_{low}}$ is a negative number. A more generalized expression, in terms of a percentage of chord, for the leading edge radius is $2\,c(t_{max}/c)^2$ where $(t_{max}/c)$ is the thickness ratio or the ratio of maximum airfoil thickness to the chord.

The leading edge radius is faired into the upper surface 12 and the lower surface 13 at a distance $x_t$ aft of the leading edge and at a distance $z_t$ above and below the chord line 21. These quantities, shown diagrammatically in FIG. 2, are expressed mathematically as:

$$x_t = R - z_t\,z'_t \quad (4)$$

$$z_t = \frac{R}{\sqrt{1+(z'_t)^2}} \quad (5)$$

where $z'_t$ is the slope of the upper and lower surfaces at points $x_t$, $z_t$ and $z_t$ and $z'_t$ for the lower surface are negative.

$$z'_t = \left(\frac{(x_m)_{mean}}{x_m}\right)\left(\frac{z_m}{(z_m)_{mean}}\right) \quad (6)$$

where $z_m$ for the lower surface ($z_{m_{low}}$) is negative.

The curvature of the upper and lower surfaces from $x_t$ to $x_{m_{up}}$ and $x_{m_{low}}$, respectively, decreases with increasing rearward distance at a rate, $d^3z/dx^3$, approximately proportional to $x^{-2.5}$, $x$ being measured rearward from the leading edge station. Points $z$ corresponding to chordwise distances $x$ between $x_t$ and $x_m$ and the slope $z'$ at chordwise distances $x$ between $x_t$ and $x_m$ are defined as:

$$z = z_m - K\,(\sqrt{x_m} - \sqrt{x - \Delta x})^2 \quad (7)$$

$$z' = K\,\left(\frac{\sqrt{x_m} - \sqrt{x - \Delta x}}{\sqrt{x - \Delta x}}\right) \quad (8)$$

where $$K = \frac{Z z'}{1 - Z} \quad (K_1 \text{ for the upper surface and } K_2 \text{ for the lower surface}) \qquad (9)$$

$$Z = \frac{1}{2} - \sqrt{\frac{1}{4} - \frac{z_m - z_t}{x_m z'_t}} \qquad (10)$$

The minimum upper curvature, $d^2z/dx^2$, located at the point 22 on the upper surface 12 of the airfoil 10 is approximately equal to $$2 \, t_{max}/c^2$$

where $t_{max}$ is the maximum thickness of the airfoil and $c$ is the chord. For the upper surface aft of the point of minimum curvature 22, the upper curvature of the upper surface 12 increases at a rate approximately proportional to $x_1^2$ where $x_1$ is a chordwise distance measured from said upper point of minimum curvature 22. The distances $z$ from the chord line 21 to the upper surface 12 at chordwise distances from $x_{m_{up}}$ to $x_{t.e.}$ are described as follows:

$$z = z_m - \left(\frac{K_1}{2x_m}\right) \frac{(x - x_m)^2}{2} - K_3 \frac{(x-x_m)^{5.5}}{5.5} \qquad (11)$$

where $$K_3 = \frac{-z'_{hd \, t.e.} - \left(\frac{K_1}{2x_m}\right)(x_{t.e.} - x_m)}{(x_{t.e.} - x_m)^{4.5}}, \qquad (12)$$

$$z' = -\left(\frac{K_1}{2x_m}\right)(x - x_m) - K_3 (x - x_m)^{4.5} \qquad (13)$$

and $z'_{t.e.}$ is the slope of the trailing edge.

The junction 27 marks the point at which the convex curvature of the lower surface 13 fairs into the concave curvature of the lower surface 26 of the trailing edge section 24. The lower curvature from the point of minimum curvature 29 to the junction 27 increases rearward at a rate approximately proportional to $x_2^2$ where $x_2$ is a chordwise distance measured from the lower point of minimum curvature 29. The expression used to determine the location of the junction 27 is $$x_r = x_m + \left(\frac{x_{t.e.} - x_m}{2}\right).$$

The distance from the chordline 21 to the lower surface 13 are determined at chordwise distances $x$ from $x_{m_{low}}$ to the point $x_r$ by the relation:

$$z = z_m - \left(\frac{K_2}{2x_m}\right) \frac{(x-x_m)^2}{2} - \frac{K_4 (x-x_m)^{5.5}}{5.5} \qquad (14)$$

$$K_4 = z_m - z_{t.e.} - 1.1591 \frac{\left(\frac{K_2}{2x_m}\right)\left(\frac{x_{t.e.} - x_m}{2}\right)^2 + 0.34091 \, (z'_{t.e.}) \left(\frac{x_{t.e.} - x_m}{2}\right)}{0.84091 \left(\frac{x_{t.e.} - x_m}{2}\right)^{5.5}} \qquad (15)$$

$$z_{t.e.} = z_{t.e.} - t_{t.e.}, \qquad (16)$$

and $$z' = -\frac{K_2}{2x_m}(x - x_m) - K_4 (x - x_m)^{4.5} \qquad (17)$$

The curvature of the lower surface 26 of the trailing edge section 24 increases rearward from junction 27 rearward to the trailing edge at a rate approximately proportional to $x_3^2$ where $x_3$ is the chordwise distance measured from said junction. The distances $z$ from the chordline 21 to the lower surface 26 of the trailing edge section 24 are determined at chordwise distances $x$ by the relation:

$$z = z_r + z'_r(x - x_r) + K_5 \frac{(x - x_r)^2}{2} + K_6 \frac{(x - x_r)^{5.5}}{5.5} \qquad (18)$$

where $$z'_r = -\left(\frac{K_2}{2x_m}\right)\left(\frac{x_{t.e.} - x_m}{2}\right) - K_4 \left(\frac{x_{t.e.} - x_m}{2}\right)^{4.5} \qquad (19)$$

$$z_r = z_m - \frac{\left(\frac{K_2}{2x_m}\right)\left(\frac{x_{t.e.} - x_m}{2}\right)^2}{2} - K_4 \frac{\left(\frac{x_{t.e.} - x_m}{2}\right)^{5.5}}{5.5} \qquad (20)$$

$$2K_5 = \left(\frac{K_2}{2x_m}\right) + \frac{z'_{t.e.}}{\left(\frac{x_{t.e.} - x_m}{2}\right)} + K_4 \left(\frac{x_{t.e.} - x_m}{2}\right)^{3.5} \qquad (21)$$

$$K_6 = \frac{K_5}{\left(\frac{x_{t.e.} - x_m}{2}\right)^{3.5}} \qquad (22)$$

$$z' = z'_r + K_5 (x - x_r) + K_6 (x - x_r)^{4.5} \qquad (23)$$

The optimum thickness of the trailing edge 14 noted as $t_{t.e.}$ has been determined experimentally to be approximately one percent of the chord.

Of course, other shapes slightly modified from the embodiment described herein are possible in the light of the above teachings. It is primarily the flow control and pressure distribution control concept, particularly across the airfoil upper surface, which comprises the novelty of the invention. The detailed description of a specific embodiment set forth above is by way of illustration only and is not to be taken as limiting on the applicant's invention. The words "approximately constant" used herein to describe local flow velocities over various airfoil surface regions are generally descriptive of conditions which are constant, slightly decreasing, slightly increasing or slightly varying from a mean.

What is claimed as new and desired to be secured by Letters Patent of the United States is:

1. An airfoil having a specific design Mach number in the range of 0.7 to 1.0 comprising: an airfoil means, said airfoil means including upper surface means for minimizing acceleration of supersonic and subsonic fluid flow over said upper surface means, said upper surface means including a upper curvature, said upper curvature including an upper point of minimum curvature located on said upper surface means aft of a chordwise point of maximum thickness and forward of a midchord station and said upper curvature increasing continuously forward and rearward from said upper point of minimum curvature; whereby, at design Mach number, supersonic flow is maintained over a major portion of said upper surface means at an approximately constant Mach number, supersonic flow decreasing to near-sonic velocity thereafter and then remaining at an approximately constant near-sonic velocity over a smaller portion of said upper surface means.

2. The airfoil of claim 1 wherein said upper curvature is approximately equal to $2\ t_{max}/c^2$ at said upper point of minimum curvature, where $t_{max}$ is maximum airfoil thickness and $c$ is the chord.

3. The airfoil of claim 2 wherein said upper point of minimum curvature is located near a 0.4 chord station.

4. The airfoil of claim 1 wherein said airfoil means includes leading edge section means for generating maximum supersonic flow expansion rearward in an area of supersonic flow above said airfoil means at the design Mach number and for avoiding flow separation adjacent said leading edge section means throughout the normal subsonic lifting range of said airfoil below the design Mach number.

5. The airfoil of claim 4 wherein said leading edge section means includes a leading edge radius approximately equal to $2c(t_{max}/c)^2$ of the chord, where $t_{max}$ is the maximum airfoil thickness and $c$ is the chord.

6. The airfoil of claim 5 wherein said upper point of minimum curvature is located near a 0.4 chord station.

7. The airfoil of claim 1 wherein said airfoil means includes trailing edge section means curving downward and rearward to a trailing edge for improving the lifting efficiency of said airfoil, said trailing edge section means including an upper surface and a lower surface having approximately the same slope near a trailing edge.

8. The airfoil of claim 7, said trailing edge section means including a trailing edge having a thickness, said thickness being approximately one percent of the chord.

9. The airfoil of claim 7 wherein said airfoil means includes lower surface means for maintaining subsonic flow across said lower surface means at and below a design Mach number, said lower surface means including a lower curvature, a lower point of minimum curvature at approximately the one third chord, junction, a junction said junction being the point at which said lower surface means joins said lower surface of said trailing edge section means.

10. The airfoil of claim 9 wherein said airfoil means includes leading edge section means for generating a maximum amount of supersonic flow expansion rearward in an area of supersonic flow above said airfoil at the design Mach number and for avoiding flow separation adjacent said leading edge section means throughout the normal subsonic lifting range of said airfoil.

11. The airfoil of claim 10 wherein said leading edge section means includes a leading edge radius approximately equal to $2c\ (t_{max}/c)^2$ of the chord where $t_{max}$ is maximum airfoil thickness and $c$ is the chord.

12. The airfoil of claim 10 wherein said upper curvature is approximately equal to $2\ t_{max}/c^2$ at said upper point of minimum curvature, where $t_{max}$ is maximum airfoil thickness and $c$ is the chord.

13. The airfoil of claim 11 wherein said upper curvature is approximately equal to $2\ t_{max}/c^2$ at said upper point of minimum curvature, where $t_{max}$ is maximum airfoil thickness and $c$ is the chord.

14. The airfoil of claim 13 wherein said lower curvature and said upper curvature decrease in amount from the leading edge to said lower point of minimum curvature and said upper point of minimum curvature, respectively, at a rate approximately proportional to $x^{-2.5}$ where $x$ is a chordwise distance from the leading edge; said upper curvature includes said upper surface of said trailing edge section means and said upper curvature increases rearward from said upper minimum point of curvature to a trailing edge at a rate approximately proportional to $x_1^2$ where $x_1$ is a chordwise distance measured rearward from said upper point of minimum curvature; said lower curvature increases rearward from said lower point of minimum curvature to said junction at a rate approximately proportional to $x_2^2$ where $x_2$ is a chordwise distance measured rearward from said lower minimum point of curvature; wherein said lower surface of said trailing edge section means includes a concave curvature, said concave curvature increases rearward from said junction to a trailing edge at a rate approximately proportional to $x_3^{\ 2}$ where $x_3$ is the chordwise distance measured rearward from said junction.

15. The airfoil of claim 14 wherein said upper point of minimum curvature is located at approximately a 0.4 chord station and said lower point of minimum curvature is located at approximately the one-third chord and said airfoil means includes a trailing edge having a thickness, said thickness being approximately one percent of the chord.

16. An airfoil designed to operate at a Mach number greater than the critical Mach number without boundary layer separation due to shock wave formation comprising:

an airfoil means, said airfoil means having an upper surface means including a first region means extending rearward from a near a leading edge station past a midchord station, said first region means for maintaining a supersonic flow and an approximately constant supersonic velocity over said first region means;

a second region means extending rearward from said first region means, said second region means for producing a drop in velocity from the supersonic velocity over said first region means to a near-sonic velocity, whereby a weak shock wave is formed over said second region means;

a third region means extending rearward from said second region means, said third region means for maintaining the near-sonic velocity produced by said second region means at an approximately constant value;

whereby shock wave energy is not sufficiently strong to cause boundary layer separation.

17. The airfoil of claim 16 wherein said airfoil means includes lower surface means having an aft portion and trailing edge section means having a lower surface, said aft portion and said lower surface constituting a fourth region means for producing velocities which are less than free stream velocity below said fourth region means.

18. The airfoil of claim 16 wherein said airfoil means includes leading edge section means located forward of said first region means and for accelerating fluid flow to a supersonic velocity rearward and above leading edge section means, said leading edge section means also for accelerating fluid flow to a subsonic velocity rearward and below said leading edge section means.

19. The airfoil of claim 18 wherein said airfoil means includes lower surface means having an aft portion and trailing edge section means having a lower surface, said aft portion and said lower surface constituting a fourth region means for producing an area of local velocities which are less than free stream velocity below said fourth region means.

20. The airfoil of claim 19 wherein said trailing edge section means includes an upper surface, said upper surface and an aft portion of said upper surface means comprising a fifth region means aft of said third region means, said fifth region means for producing a velocity decrease from the velocity over said third region means to a velocity near free stream velocity at a trailing edge, and said lower surface means includes a sixth region means extending rearward from near a leading edge station to near a midchord station, said sixth region means maintaining the subsonic velocity produced by said leading edge section means at an approximately constant value over said sixth regionn means, and said lower surface means also includes a seventh region means extending from said sixth region means rearward to said fourth region means, said seventh region means decreasing the velocity over said sixth region means to free stream velocity.

* * * * *